(12) United States Patent
Takato et al.

(10) Patent No.: US 7,798,026 B2
(45) Date of Patent: Sep. 21, 2010

(54) GENERATED POINTER IMAGE FOR AN INSTRUMENT CLUSTER DISPLAY

(75) Inventors: Kenichi Takato, Rochester Hills, MI (US); Vyacheslav B. Birman, Auburn Hills, MI (US); Werner Eckardt, Rochester, MI (US)

(73) Assignee: Continental Automotive Systems US, Inc., Auburn Hills, MI (US)

( * ) Notice: Subject to any disclaimer, the term of this patent is extended or adjusted under 35 U.S.C. 154(b) by 478 days.

(21) Appl. No.: 11/651,350

(22) Filed: Jan. 9, 2007

(65) Prior Publication Data
US 2007/0157745 A1     Jul. 12, 2007

Related U.S. Application Data

(60) Provisional application No. 60/758,055, filed on Jan. 11, 2006, provisional application No. 60/802,571, filed on May 22, 2006.

(51) Int. Cl.
*G01D 7/02* (2006.01)
(52) U.S. Cl. ....................................... 73/866.3; 353/14
(58) Field of Classification Search ........................ None
See application file for complete search history.

(56) References Cited

U.S. PATENT DOCUMENTS

| 2,676,515 A | | 4/1954 | Diehl |
| 2,782,679 A | * | 2/1957 | Brueder ........................ 353/14 |
| 3,829,771 A | | 8/1974 | Burkhardt et al. |
| 5,651,366 A | * | 7/1997 | Liang et al. .................. 600/439 |
| 2005/0259301 A1 | * | 11/2005 | Aoki et al. ..................... 359/13 |

FOREIGN PATENT DOCUMENTS

EP         1610099 A2     12/2005

OTHER PUBLICATIONS

International Search Report and Written Opinion dated Sep. 12, 2007.

* cited by examiner

*Primary Examiner*—Robert R Raevis

(57) ABSTRACT

An instrument cluster assembly includes a pointer assembly that generates a pointer image that moves along the scale to point to a portion of the scale that corresponds with the measured parameter. The pointer assembly projects the pointer image such that a solid pointer is not required and therefore does not obstruct any portion of the dial face. The pointer image tracks along the oval shape of the scale without the limitations imposed on a physical pointer rotated about a fixed central axis.

15 Claims, 3 Drawing Sheets

GENERATED POINTER IMAGE FOR AN INSTRUMENT CLUSTER DISPLAY

CROSS REFERENCE TO RELATED APPLICATION

The application claims priority to U.S. Provisional Application No. 60/758,055 and 60/802,571 which were filed on Jan. 11, 2006, and May 22, 2006 respectively.

BACKGROUND OF THE INVENTION

This invention generally relates to an instrument cluster display. More particularly this invention relates to an instrument cluster display for an automobile that includes a virtual pointer for indicating a value on an instrument dial.

An instrument cluster for a motor vehicle includes a dial with a scale indicative of a vehicle performance or other operational parameter. A pointer is rotated about a central axis to point to a specific indicator on the dial to communicate the current state of the measured parameter. The basic configuration of an instrument cluster is modified to provide a desired aesthetic appearance to the interior of a vehicle. Because the instrument cluster is an integral part of vehicle operation, automotive manufactures continually update and improve the appearance of the vehicle instrumentation.

One variation of a basic instrument dial is to elongate the scale to form a somewhat oval or stretched scale. The stretched scale includes a pointer that still must rotate about a central axis. Because of the stretched, oblong shape, the radial distance between the pointer axis of rotation and the scale is longer in some areas and shorter in other areas. The different radial distance necessitates a pointer that is of length to indicate on the farthest points of the dial scale.

Disadvantageously, the pointer is larger than required for a substantial portion of the dial scale and creates the appearance that the pointer is growing and shrinking depending on the position and movement along the dial scale. Further, in some instances, the pointer may obstruct a portion of the dial scale potentially making it difficult to read accurately the current state of the measured performance parameter.

Accordingly, it is desirable to develop and design an instrument dial cluster that provides the desired elongated appearance without the problems associated with rotating a pointer about a fixed axis.

SUMMARY OF THE INVENTION

An example instrument cluster assembly includes a reflective surface disposed along a scale and a pointer assembly that directs light onto the reflective surface to generate a pointer image.

The example instrument cluster assembly includes a pointer assembly that generates a pointer image that moves along the scale to point to a portion of the scale that corresponds with the measured parameter. The pointer image moves along the path defined by the scale to provide the desired indication of current engine speed.

The pointer image is generated from a pointer assembly hidden from view under a secondary display. The pointer assembly projects the pointer image such that a solid pointer is not required and therefore does not obstruct any portion of the dial face. Further, because the pointer image is not a solid part, it can track along the shape of the scale without the limitations imposed on a physical pointer rotated about a fixed central axis.

These and other features of the present invention can be best understood from the following specification and drawings, the following of which is a brief description.

DETAILED DESCRIPTION OF THE PREFERRED EMBODIMENT

Figure 1:
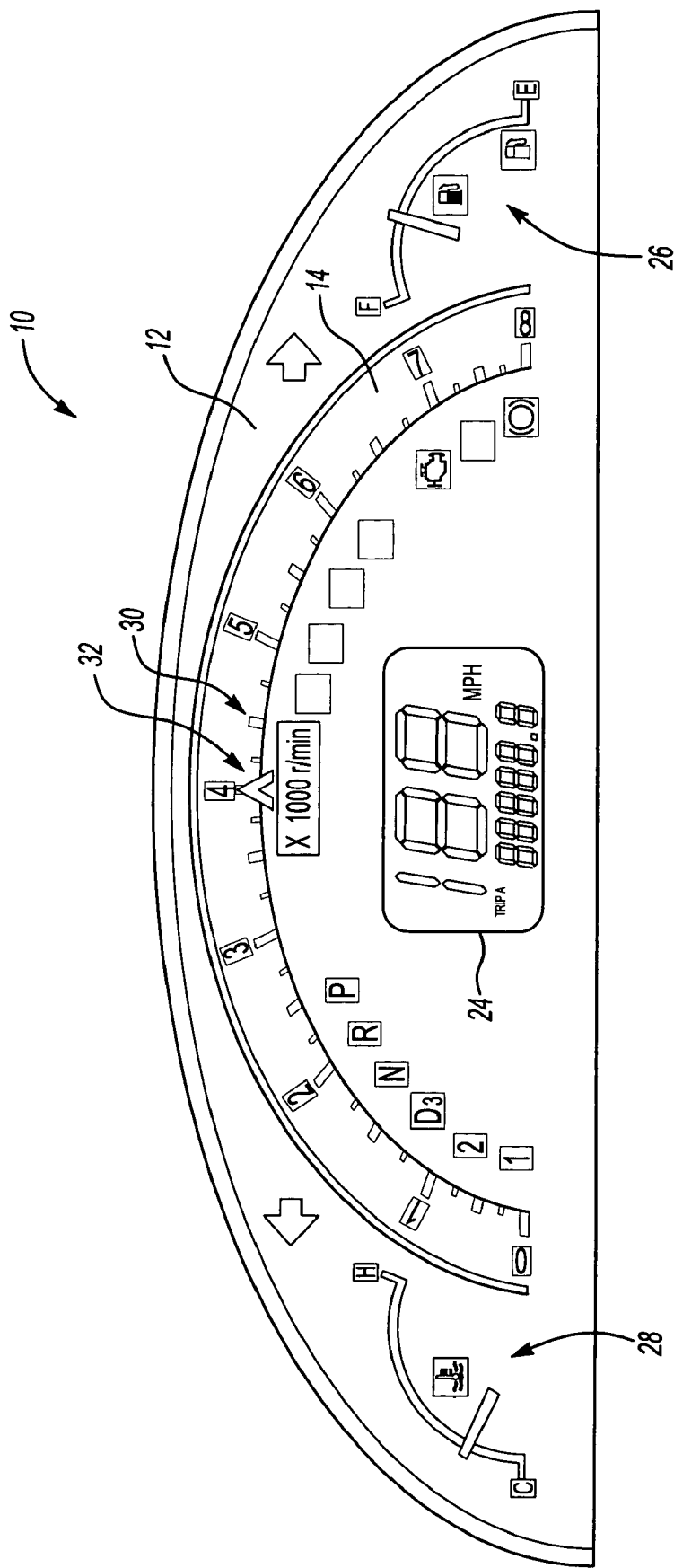
FIG. 1 is a front view of an example instrument cluster assembly.

Referring to FIG. 1, an example instrument cluster assembly 10 includes a generally elliptical shape. A primary dial face 12 includes a scale 14 with several indicator points 30 arranged in an elliptical or oval shape. A pointer assembly (not visible in FIG. 1) generates a pointer image 32 that moves along the scale 14 to point to a portion of the scale 14 that corresponds with the measured parameter. The example scale 14 communicates engine speed in rotations per minute. The example instrument cluster assembly 10 includes a secondary display 24 that provides a digital value indicative of current vehicle speed. An auxiliary display 26 indicates the current fuel level within the vehicle, and another auxiliary display 28 provides an indication of coolant temperature. As appreciated, the layout of the example instrument cluster assembly 10 communicates several different measurements and operating parameters to an operator of a vehicle.

The pointer image 32 moves along the oval path defined by the scale 14 to provide the desired indication of current engine speed. The pointer image 32 is generated from a pointer assembly hidden from view under the secondary display 24. The pointer assembly projects the pointer image 32 such that a solid pointer is not required and therefore does not obstruct any portion of the dial face 12. Further, because the pointer image 32 is not a solid part, it can track along the oval shape of the scale 14 without the limitations imposed on a physical pointer rotated about a fixed central axis.

Figure 2:
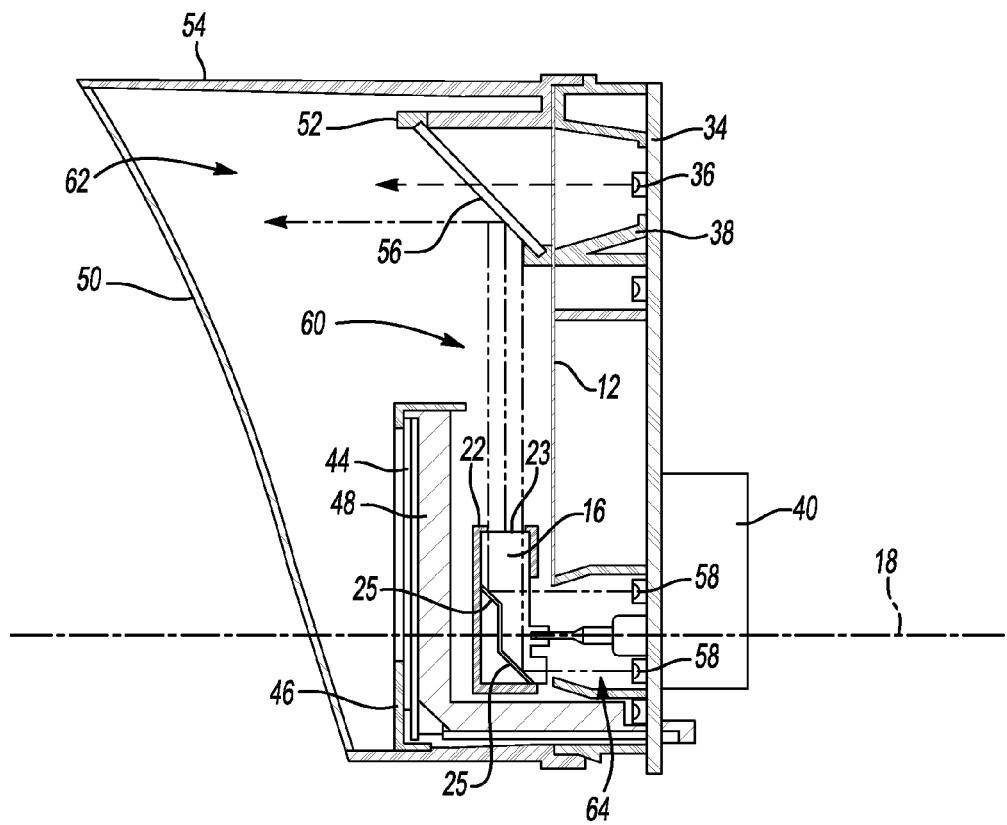
FIG. 2 is a cross-sectional view of the example instrument cluster assembly.

Referring to FIG. 2, the pointer assembly 16 rotates about a central axis 18 and generates the image 32 by directing light through a light pointer cap 22. The pointer assembly includes a light emitter 20 covered by the light pointer cap 22. The light pointer cap 22 includes an opening shaped to generate the pointer image 32. A reflective surface 56 is disposed along the scale 14 of the dial face 12 and is angled relative to the dial face 12 to direct and reflect light from the pointer assembly 16. The reflective surface 56 is supported partially by the dial face 12 and also partially by a mask 52. The mask 52 also contains light from a light source 36 to a desired area.

The instrument cluster assembly 10 includes a housing 54 that supports a lens 50. The lens 50 is clear to allow viewing of the dial face 12. The reflective surface 56 is disposed at an angle relative to the dial face 12 and also to light 60 emitted from the pointer assembly 16 to create the pointer image 32. The pointer image 32 is thereby visible on the reflective surface 56. The light 60 from the pointer assembly 16 projects a reverse image of the desired pointer image 32. The visible reflection of the pointer image 32 thereby appears as desired once reflected from the reflected surface 56.

The example secondary display 24 includes an LCD display 44 that is supported over the pointer assembly 16. The secondary display 24 therefore covers the pointer assembly 16 to hide it from view by a vehicle operator. A light guide 48 directs light from a light source 58 to the LCD display 44 to provide illumination. A cover 46 is provided that surrounds the light guide to contain illumination and prevent light from being projected in undesired directions.

The light sources 58 also direct light into the pointer assembly 16. The pointer assembly 16 includes reflective surfaces 25 that reflect light 64 from the light sources 58 through the pointer cap 22 and onto the reflective surface 56. A printed circuit board 34 supports the light sources 58 along with a motor 40 for rotating the pointer assembly 16.

The example light sources 58 are light emitting diodes LEDs that are mounted to the main circuit board 34. The example LEDs 58 can be of any color or brightness as is desired for a specific application. Further, although two LEDs 58 are shown any number of LEDs can be utilized to provide the desired uniformity of the projected pointer image 32.

The dial face 12 is illuminated by the light sources 36 that are disposed within a light housing 38. The light housing 38 contains light so that is directed upward through the dial face to illuminate the scale 14.

Figure 3:
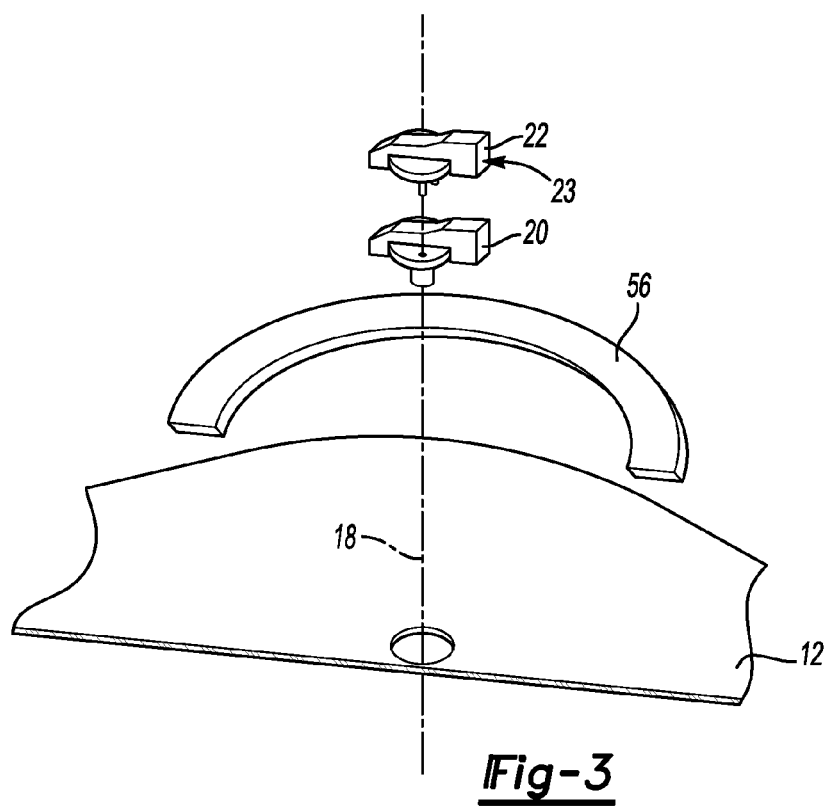
FIG. 3 is a partial exploded view of the example instrument cluster assembly.

Referring to FIG. 3, the example reflective surface 56 is shown as an elliptical shape to match the desired shape of the scale 14. Although the disclosed example is elliptical in shape other curvilinear shapes would benefit from this invention. Further, a circular scale could also be utilized with the example pointer assembly 16. The pointer image 32 tracks along the reflective surface 56 to provide the desired indication of the measured parameter without the limitations of a solid pointer.

The example reflective surface 56 is a separate piece that is attached to the dial face 12. This construction provides for the use of a simple flat dial face 12 of one material and a reflective surface fabricated from a different reflective material.

Figure 4:
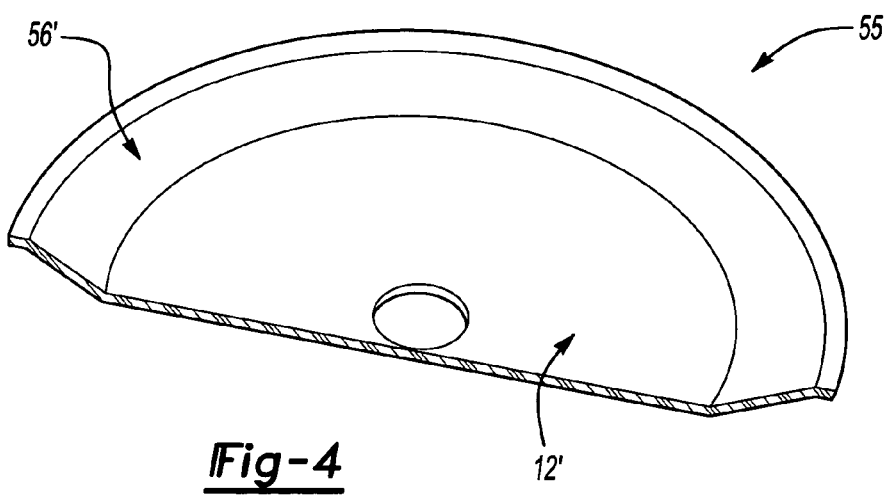
FIG. 4 is a perspective view of an example dial face and reflective surface.

Referring to FIG. 4, an example dial face/reflective surface 55 is formed from a single piece of material. The single piece of material includes the reflective surface 56' integrally formed with the dial face 12'. The integral construction can simplify assembly. The entire dial face/reflective surface 55 can be formed form a smoked glass material that is reflective and is also capable of being illuminated for viewing a scale 14.

The reflective surfaces 56', and 56 are both planer in that the thickness in minimal such that the top surface is the reflective surface where the generated pointer image is visible.

The example pointer image 32 (FIG. 1) is chevron shaped with the point providing the visual indication on the scale 14. The shape of the pointer image 32 is defined by the opening 23 for light within the pointer cap 22. Other pointer image shapes and sizes can be provided by modifying the shape of the opening 23 in the pointer cap 22.

The example reflective surface 56 is a smoked lens that provides the desired reflection of light 60 from the pointer assembly 16, while also providing for viewing of the scale 14 disposed under the reflective surface 56. The scale 14 is visible when illuminated by the light source 36 and is substantially not visible when not illuminated.

Figure 5:
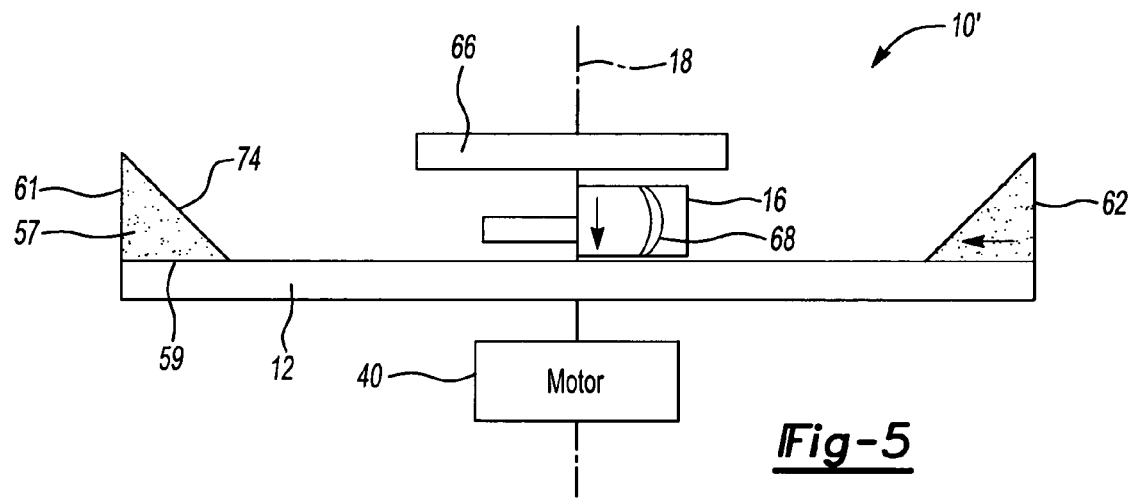
FIG. 5 is a schematic cross-sectional view of another example instrument cluster assembly.

Referring to FIG. 5, another example instrument cluster assembly 10' includes a reflective ring 57 mounted directly to the dial face 12. The pointer assembly 16 is rotated about the axis 18. The pointer assembly 16 emits light that is shaped in a desired manner to form the pointer image 62. The pointer assembly 16 includes a lens 68 for focusing the pointer image 62 onto the reflective ring 57.

The example lens 68 includes a positive curve that creates an inverse real magnified image on the reflective ring 57. The reflective ring 57 is a solid part including a flat bottom surface 59, a cylindrical outer surface 61 and an angled inner surface 74. The example angled surface 74 is 45 degrees relative to the dial face 12. The ring 57 reflects approximately 10% of the emitted light to generate the desired pointer image 62.

Figure 6:
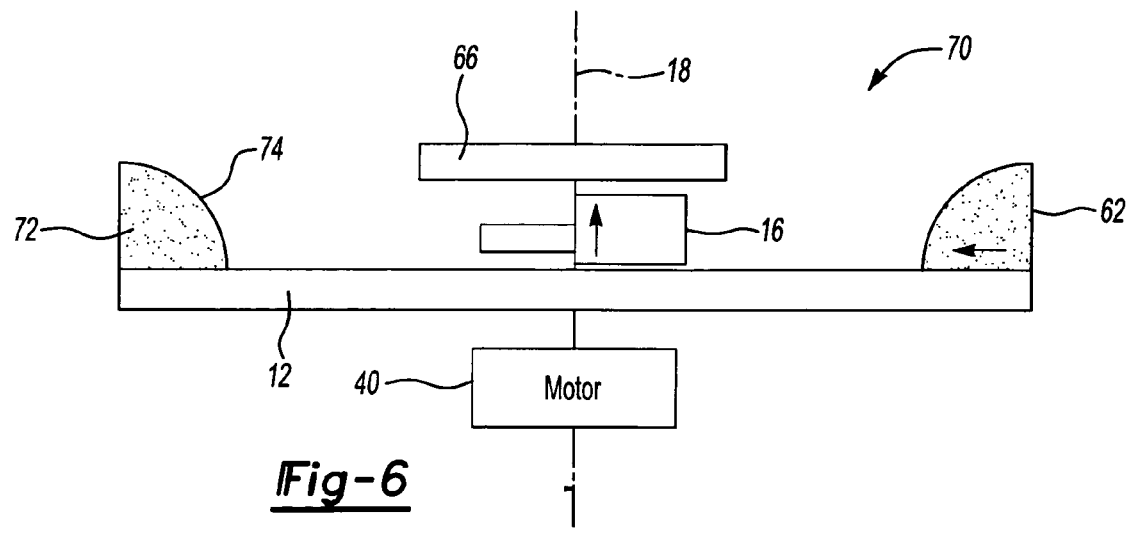
FIG. 6 is a schematic cross-sectional view of another example instrument cluster assembly.

Referring to FIG. 6, another instrument cluster assembly 70 includes a reflective ring 72 having a curved surface 74. The curved surface 74 provides for reflecting optics only without the need for the lens 68. The virtual pointer image 62 can be magnified as desired by adjusting the shape and radius of the curved surface 74. The example curved surface 74 provides for a magnification of less then one. In this example, the pointer assembly 16 does not include the lens and simply emits the desired pointer image 62 onto the reflective ring 72.

The curved surface 74 generates a pointer image 62 that appears to be along a plane different than that of the dial face 12. This appearance provides a desired appearance while maintaining the utility of the pointer image 62 to indicate the current measurement of the desired vehicle operating parameter.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An instrument cluster assembly comprising:
   a dial face including a scale for indicating a desired parameter;
   a pointer assembly including a pointer rotatable about a central axis, wherein the pointer includes a light reflector and a pointer cap that defines an opening through which light is emitted, the opening including a shape that defines a pointer image; and
   a reflective surface for directing light emitted from the light reflector to display the pointer image for communicating a value of the desired parameter.

2. The assembly as recited in claim 1, wherein the reflector emits light in a direction parallel with the dial face to the reflective surface to generate the pointer image on the reflective surface.

3. The assembly as recited in claim 1, wherein the scale is viewable through the reflective surface.

4. The assembly as recited in claim 3, including a light source for illuminating the scale and make it viewable through the reflective surface.

5. The assembly as recited in claim 1, wherein the reflective surface comprises a surface disposed at an angle relative to the dial face.

6. The assembly as recited in claim 1, wherein the reflective surface comprises a mirror.

7. The assembly as recited in claim 1, wherein the opening comprises an arrow shape.

8. The assembly as recited in claim 1, wherein the pointer cap includes a lens for focusing light onto the reflective surface.

9. An instrument cluster assembly comprising:
   a primary face comprising a scale for indicating a desired parameter;

a pointer assembly including a reflector and a pointer cap, the pointer cap including an opening that defines a shape of the pointer image; and a reflective surface mounted to a surface of the primary face over the scale onto which light from the pointer assembly is projected to generate the pointer image for indicating the desired parameter on the scale.

10. The assembly as recited in claim 9, wherein the scale for indicating a desired parameter is elliptical.

11. The assembly as recited in claim 9, wherein the pointer assembly includes a lens for focusing light onto the reflective surface to generate the pointer image.

12. The assembly as recited in claim 9, including a secondary face disposed proximate the primary face.

13. The assembly as recited in claim 12, wherein the secondary face comprises an electronic display for displaying a value indicative of desired operating parameter.

14. The assembly as recited in claim 9, wherein the primary face is selectively illuminated between an off condition and an on condition, wherein the scale is visible in the on condition and not visible in the off condition.

15. The assembly as recited in claim 9, wherein the primary face and reflective surface comprise a single part.

\* \* \* \* \*